United States Patent [19]

Tripp

[11] Patent Number: 4,661,009
[45] Date of Patent: Apr. 28, 1987

[54] QUICK CHANGE COUPLING FOR MACHINE TOOL ARBORS AND THE LIKE

[75] Inventor: Fred D. Tripp, Austin, Tex.

[73] Assignee: Grentek, Inc., Austin, Tex.

[21] Appl. No.: 838,684

[22] Filed: Mar. 12, 1986

[51] Int. Cl.⁴ .......................... F16B 21/04; F16D 1/00
[52] U.S. Cl. .................................... 403/349; 403/348; 403/27; 403/165; 403/225; 279/1 ME; 279/1 Q; 279/81
[58] Field of Search ............... 403/349, 348, 330, 354, 403/302, 304, 165, 27, 243, 225; 279/1 ME, 1 Q, 1 A, 1 B, 77–81

[56] References Cited

U.S. PATENT DOCUMENTS

| 402,132 | 4/1889 | Berry | 403/349 |
|---|---|---|---|
| 867,162 | 9/1907 | Seidl | 403/349 |
| 931,327 | 8/1909 | Manzel | 403/349 X |
| 1,130,726 | 3/1915 | Greve | 403/348 X |
| 1,333,436 | 3/1920 | Monroe | 403/354 X |
| 2,032,196 | 2/1936 | Blake | 279/77 |
| 2,833,548 | 5/1958 | Clark | 279/1 Q |
| 2,852,286 | 9/1958 | Guy et al. | 403/243 X |
| 2,901,258 | 8/1959 | Brandifi | |
| 2,915,762 | 12/1959 | Kivela | 403/348 X |
| 3,736,011 | 5/1973 | Wand | 403/302 |
| 3,854,832 | 12/1974 | Cowper | 403/349 |
| 3,858,910 | 1/1975 | Oetiker | 403/349 X |
| 4,006,996 | 2/1977 | Kasabian | 279/1 B X |
| 4,269,422 | 5/1981 | Biggs | 403/330 X |
| 4,274,774 | 6/1981 | Haga et al. | 279/1 A X |
| 4,486,918 | 12/1984 | Peebles | 403/348 X |

FOREIGN PATENT DOCUMENTS

| 465309 | 9/1928 | Fed. Rep. of Germany | 403/349 |
|---|---|---|---|
| 471249 | 8/1937 | United Kingdom | 403/349 |

Primary Examiner—Cornelius J. Husar
Assistant Examiner—Todd G. Williams

[57] ABSTRACT

A quick change coupling is provided which is suitable for coupling shafts or tubular members to one another and for coupling a machine tool arbor to a shaft. The apparatus includes a shaft provided with a bayonet receptacle defining one or more bayonet slots. Another elongated member is receivable by the bayonet receptacle and includes one or more detents which are received in locked relation by the bayonet slots. A protective skirt extends from one of the elongated members and encloses a portion of the opposite member. One or more elastomeric members are positioned for engagement with the protective skirt and an elongated member and functions to dampen vibrations therebetween. The elastomeric member may be in the form of a seal to prevent dust and other contaminants from entering the bayonet joint between the elongated elements.

20 Claims, 5 Drawing Figures

QUICK CHANGE COUPLING FOR MACHINE TOOL ARBORS AND THE LIKE

FIELD OF THE INVENTION

This invention relates generally relates to couplings between elongated members such as shafts, tubes, etc. and more specifically concerns the provision of a quick release type coupling mechanism enabling members to be quickly and efficiently assembled or released without necessitating the use of tool. Even further, the present invention is directed to the provision of a quick release coupling mechanism enabling machine tool arbors to be manually assembled and disassembled from drive or driven shafts.

BACKGROUND OF THE INVENTION

In the machine tool industry, rotatable tool arbors are typically assembled to rotatable drive shafts by means of chuck devices that effectively resist the centrifugal forces that are encountered during operation of the machine tool. As the machine tool is operated at high speed, unless exceptional balancing of the tool system is accomplished, the machine tool may develop severe vibration that can be detrimental to operations and can be unsafe for workers. It is desirable therefore to provide a quick change coupling system that dampens vibration that will otherwise be transmitted through the coupling to the drive shaft.

In many cases, the work that is done by the machine tools produces a significant amount of dust which can foul the chuck of the machine tool and otherwise interfere with proper fitting relation between the tool arbor and the chuck. It is also desirable to provide a quick change tool retaining system which also protects the tool holding mechanism from fouling or contamination by dust, metal particles, etc.

It is also desirable to provide certain tool arbors with a quick change capability especially where the machine tools involved are often changed to permit workers to employ a single tool mechanism for multiple functions. It is desirable, therefore, to provide a quick change coupling for machine tool arbors to enable greater efficiency in conducting work processing operations.

In the case of shafts or tubular members which are releasably interconnected it is desirable to provide a quick change coupling system to enable manual assembly and disassembly of the same without requiring tools. Although quick disconnect type couplings are available, under circumstances where vibration is significant where dust or other contaminants are encountered, the coupling system can be fouled or must be frequently cleaned to maintain it in servicable condition. It is also desirable to provide a quick change coupling which may be lubricated for efficiency and extended service life even though it may be located in an environment that might be laden with contaminants.

THE PRIOR ART

Various types of quick disconnect couplings are disclosed in U.S. Pat. Nos. 402,132 of Berry; 867,162 of Seidl; 931,327 of Manzel; 3,736,011 of Ward; 3,854,832 of Cowper; 3,858,910 of Oetiker and 4,269,422 of Biggs. None of these quick change coupling systems are provided with vibration dampening or protection from contaminants.

SUMMARY OF THE INVENTION

It is a feature of the present invention to provide a novel quick change coupling assembly which is effectively manually actuatable and which is readily adapted for interconnecting drive shafts and machine tool arbors and also for coupling elongated members such as shafts, tubular members, etc.

It is also a feature of this invention to provide a novel quick change coupling system having the capability of dampening vibration that may occur during operation of the apparatus involved.

It is an even further feature of this invention to provide a novel quick change coupling assembly wherein the joint between coupled elements is encapsulated and protected from contamination by dust, metal particles and other contaminants. It is also an important feature of the present invention to provide a novel quick change coupling assembly which includes indicia which is visible only when the coupling is properly assembled in locked relation, thereby protecting workers from the hazard of inadvertent disassembly of the coupling.

It is also a feature of this invention to provide a novel quick change coupling incorporating means to establish positive locking of the same in the operative, assembled condition thereof.

Briefly, in the preferred embodiment of this invention a shaft member is provided having a bayonet receptacle at the free extremity thereof, which receptacle includes one or more bayonet slots. The bayonet slot or slots may be offset from the end of the shaft and may be in the form of one or more J-slots having parallel entry and locking portions interconnected by a rotary slot portion. The bayonet slot or slots are spaced from the end of the shaft member thereby providing the terminal end of the shaft with an unbroken circular portion which provides resistance to hoop stresses. A machine tool arbor is provided having an elongated shaft member which is positioned in close fitting relation within an elongated bore defining a portion of the bayonet receptacle. A detent member extending transversely from the arbor shaft is enabled to traverse the J-slot or bayonet slot during locking of the machine tool arbor to the drive shaft. The detent member is retracted into the locking portion of the bayonet slot and is restrained therein by the force of a compression spring which continuously urges the assembled arbor toward its released position from the drive shaft.

A portion of the drive shaft, which may be an annular extension of the drive shaft or may be formed by an external sleeve, defines a protective skirt member which receives an enlarged portion of the arbor in close fitting relation therein when the arbor is assembled in locked position relative to the drive shaft. The sleeve also provides resistance to hoop stresses. One or more elastomeric members are interposed between the enlarged portion of the arbor and the protective skirt to provide one or both of the functions of dampening vibration between the assembled members and sealing the joint between the members. For purposes of safety, indicia in the form of a circular position indicator ring is provided on the tool arbor. The indicia ring is barely visible to the user when the detent of the arbor is properly located within the locking portion of the bayonet slot. If the locking detent is not properly seated, the indicia ring will not be visible, thus providing indication to the worker that locking of the arbor must be insured before the tool is used. This same feature applies equally to quick change shaft or tube couplings embodying this invention.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of this invention and are therefore not to be considered limiting of its scope, for the invention may admit to other equally effective embodiments.

In the drawings:

Figure 1:
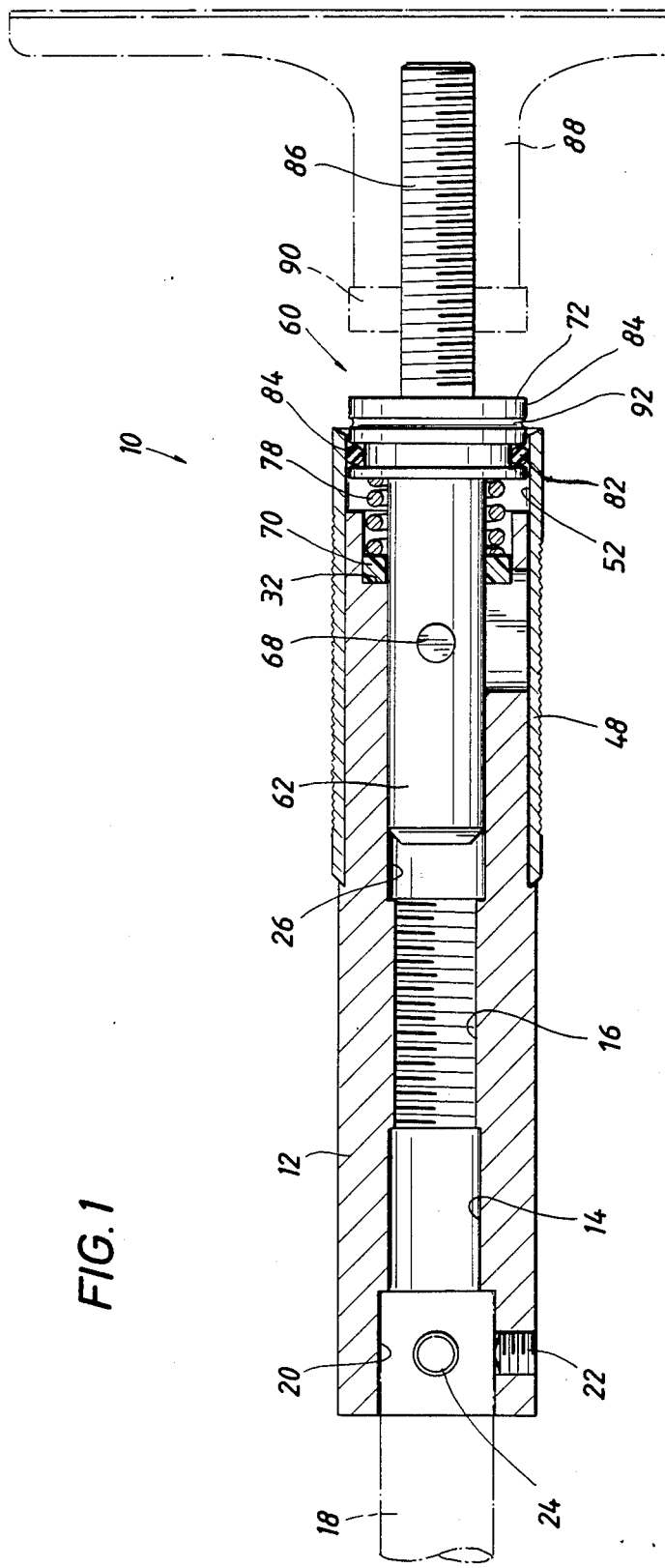

The present invention, both to its organization and manner of operation together with further objects and advantages thereof may best be understood by way of illustration and example of certain embodiments when taken in conjunction with the accompanying drawings in which:

FIG. 1 is a sectional view of a quick change locking coupling manufactured according to the teachings of this invention and showing a tool arbor in assembled relation with the bayonet receptacle of a drive shaft member such as a motor shaft.

Figure 2:
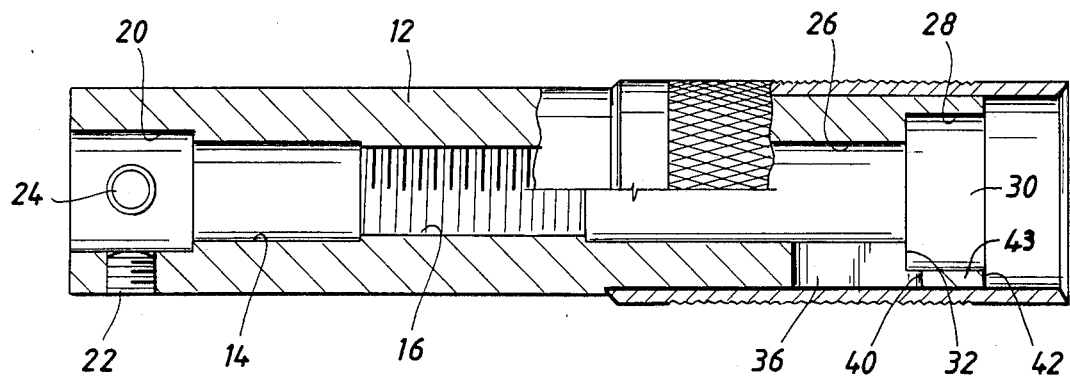

FIG. 2 is a sectional view of the draft shaft portion of the coupling of FIG. 1.

Figure 3:
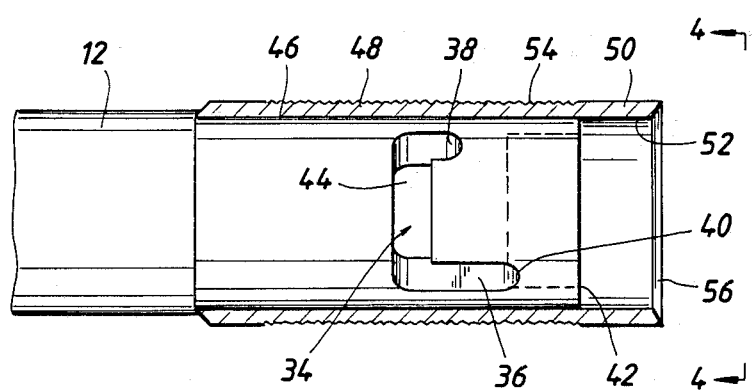

FIG. 3 is a partial sectional view of the drive shaft portion of the apparatus as shown in FIG. 2, with the structure defining the bayonet slot being presented in detail.

Figure 4:
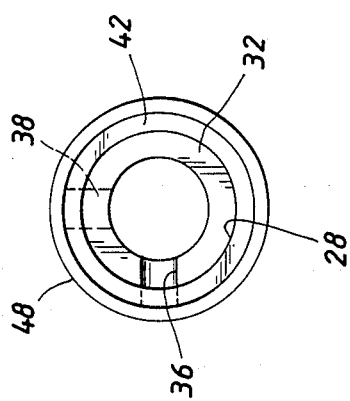

FIG. 4 is an end view taken along line 4—4 of FIG. 3.

Figure 5:
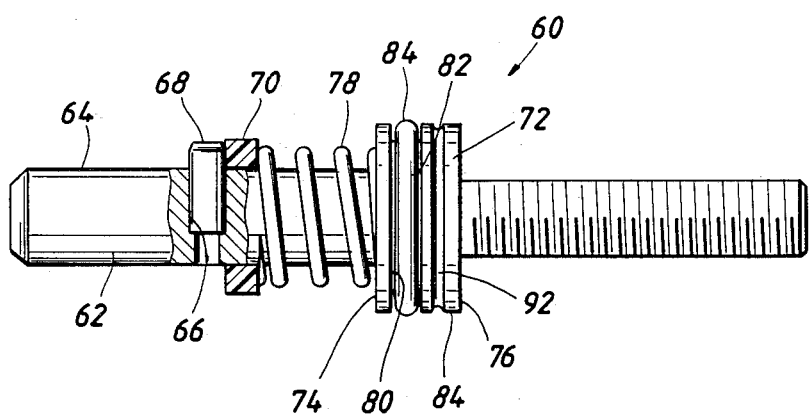

FIG. 5 is a side elevational view of the tool arbor portion of the apparatus of FIG. 1, illustrating the positions of the components thereof when separated from the bayonet receptacle of FIG. 2 and with a part thereof broken away and shown in section.

DETAILED DESCRIPTION OF PREFERRED EMBODIMENT

Referring now to the drawings and first to FIG. 1, the present invention is shown taking the form of a quick change coupling between a tool arbor and a drive shaft, the apparatus being shown generally at 10. It should be borne in mind that use of the quick change coupling of this invention may conveniently take a number of different forms within the spirit and scope of this invention, the quick change arbor coupling shown and described herein being representative of only one suitable form of this invention. An elongated tubular shaft 12 is provided having an internal bore 14 and internal threads 16 for receiving respective portions of a drive shaft 18, such as the drive shaft of an electric motor. An enlarged portion of the shaft 18 is received within an enlarged portion 20 of the drive shaft receptacle and set screws such as shown at 22 and 24 are employed to secure the tubular shaft 12 in nonrotatable, otherwise immovable relation with respect to the drive shaft 18. The coupling shaft 12 is also bored to define an elongated receptacle passage or socket 26 and with an enlarged outer bore portion 28 forming a follower receptacle 30. The intersection of bores 26 and 28 forms a circular stop shoulder 32.

As shown in FIG. 3 the coupling shaft 12 is formed to define a bayonet slot shown generally at 34. The bayonet slot includes an entry slot portion 36 and a locking slot portion 38 which are disposed in substantially parallel relation. The entry slot 36 is of longer length as compared with the locking slot 38 with one end 40 of the entry slot being disposed in spaced relation with the end surface 42 of the coupling shaft 12. Spacing of the bayonet slot from the end 42 of the shaft leaves an unbroken ring portion 43 at the terminal end of the shaft which provides efficient resistance against hoop stresses and permits use of this invention in couplings designed for heavy duty service. The end portion 40 of the entry slot 36 also intersects the enlarged bore portion 28 of the receptacle passage socket. The bayonet slot 34 also defines a rotational portion 44 which interconnects the entry slot portion 36 and the locking portion 38 of the bayonet slot.

The coupling shaft 12 is also formed to define a slightly reduced diameter surface 46 about which is positioned a peripheral sleeve member 48. A portion of the sleeve member extends beyond the end surface 42 of the coupling shaft and defines a circular protective skirt 50 forming an inner cylindrical surface 52. The outer surface of the sleeve member 48 defines a knurled section 54 enabling the user to establish a manual gripping relation with it as desired. The free end portion of the sleeve 48 is flared outwardly as shown at 56 and serves to guide the tool arbor being inserted into the bayonet receptacle. It should be understood that the sleeve may be integral with the shaft 12 if desired, in which case the shaft would merely form a circular extension forming surface 52.

With reference now to FIG. 5 a tool arbor, constructed in accordance with the present invention, is illustrated generally at 60 and incorporates an elongated arbor shaft 62 forming a cylindrical outer surface 64 of a dimension having close fitting relationship with the inner surface of the receptacle passage or socket 26 of the coupling shaft 12. Intermediate the length of the arbor shaft 62 is formed a transversely oriented bore 66 having a detent 68 in the form of dowel pin disposed in pressed fitted relation therein. A circular follower member 70 is positioned movably about a portion of the arbor shaft 62 and is of an outer peripheral dimension closely fitting the inner peripheral dimension defined by the cylindrical surface 28 of the coupling shaft. The follower member 70 is therefore adapted to fit closely within the follower receptacle 30 and to engage the circular abutment surface 32.

The arbor member 60 is also provided with an enlarged diameter intermediate portion 72 forming circular stop shoulders 74 and 76 at respective axial extremities thereof. A compression spring 78 is positioned about the arbor shaft 62 and is interposed between the follower member 70 and the stop shoulder 74 and is of a length normally urging the follower member against the detent member 68 as shown in FIG. 5. The enlarged diameter intermediate portion 72 also defines a circular external groove 80 within which is positioned a circular elastomeric member 82. The elastomeric member may, if desired, be in the form of an Oring composed of rubber or rubber-like material and sized such that an annular peripheral portion 84 thereof extends radially beyond the outer cylindrical surface of the intermediate portion 72 of the arbor shaft.

As shown in FIG. 1 the arbor shaft 62 is inserted into the bayonet receptacle with the outer periphery of shaft 62 in close fitting relation with the inner cylindrical surface defined by the receptacle passage or socket 26. Before insertion of the arbor shaft into the bayonet receptacle has been completed the follower member 70 will have moved into contact with the circular internal stop shoulder 32. Continued linear insertion movement of the shaft 62 therefore occurs as the detent member 68 is moved linearly away from the follower member 70 and the spring member 78 is compressed.

At the initial stage of arbor shaft insertion, the arbor shaft is positioned with the detent member 68 in registry with the entry portion 36 of the bayonet slot and further inward of insertion movement of the arbor shaft continues until the detent member 68 has reached the rotary connecting portion 44 of the bayonet slot. When this has occurred the arbor shaft is rotated causing the detent member to traverse the rotary section 44 of the bayonet slot until it is in registry with the locking portion 38 of the bayonet slot. When this has occurred, the compression spring 78, continuously applying an outwardly directed force to the tool arbor member, uges the detent member 68 into the locking portion 38 of the bayonet slot. When this locking position has been achieved, the arbor member 60 is positively received and locked within the bayonet receptacle; hence the arbor member cannot be inadvertently ejected from the bayonet receptacle even during high speed rotation of the coupling shaft 12.

When removal of the arbor member from the bayonet receptacle is desired, the user will simply force the arbor member inwardly, driving the detent member and arbor shaft 62 inwardly against the compression of the spring 78. When the detent member 68 has moved inwardly sufficiently for registry with the rotational portion 44 of the bayonet slot, the arbor member 60 is rotated approximately 90 degrees to a position of registry with the entry portion 36 of the bayonet slot. When this has occurred, the arbor member is forced outwardly by expansion of the compression spring 78. As the spring 78 expands upon removal of the shaft 62 from the bore 26, the follower member 70 will be forced toward the detent member 68. After seating of the follower member 70 against the detent member, the arbor 60 is simply withdrawn from the bayonet receptacle.

If shaft rotation is reversed, the entry and locking portions of the bayonet slot will be reversed accordingly. For a double shafted drive motor, therefore, where a motor shaft extends from each side of the motor, oppositely directed bayonet slots would be employed in the respective shaft coupling.

The arbor member 60 is provided with a threaded shaft extension 86 which is adapted to receive a working element 88 such as the sanding disk shown in broken line. Obviously, the working member 88 may conveniently take the form of any number of different work devices such as buffing wheels, grinding wheels, drill chucks, etc. The working member is secured to the threaded shaft 86 by means of a lock nut, also shown in broken line at 90.

During operation of the working tools, in many cases a considerable amount of dust is generated. It is desirable to prevent dust and other contaminants from entering and fouling the bayonet receptacle and the tool arbor member. It is therefore desirable to provide means for establishing a seal between the arbor member and the rotatable coupling shaft 12 such that dust and other contaminants are effectively excluded from the bayonet joint established between the arbor and shaft. According to the present invention, this feature is efficiently accomplished by a protective skirt and seal assembly which achieves sealed encapsulation of the coupling joint. As mentioned above, the outer sleeve member 48 extends beyond the end portion 42 of the coupling shaft and defines a protective skirt 50. This protective skirt defines an inner cylindrical surface 52 which is engaged by the peripherally extended portion 84 of the circular seal element 82 in the manner shown in FIG. 1. In the locked position of the arbor member 60 relative to the bayonet slot of the coupling shaft 12 a seal is effectively formed and dust and other contaminants are effectively excluded. The outer portion of the bayonet slot, as shown in FIG. 3 is closed by means of the sleeve member 48. Thus, the bayonet connection between the arbor member and the bayonet receptacle of the coupling shaft is effectively sealed and protected.

When high speed rotation of a work member occurs, the connection between the arbor member 60 and the coupling shaft may be subjected to considerable vibration in the event the work tool is slightly unbalanced. Effective dampening of such vibration is accomplished by the circular seal member 82. The seal member engages the inner surface 52 of the protective skirt 50 with a significant degree of interference fitting force such that the arbor member is positively centered with respect to the coupling shaft. Any vibration passing from the work member through the arbor member through the coupling shaft is dampened by the elastomeric material of the O-ring sealing member 82. Thus, the sealing member provides a dual function of accomplishing effective sealing to protect the bayonet connection from contamination and also dampening mechanical vibrations as the work member is rotated.

It should be borne in mind that the annular member 82 may, if desired, be of a form merely providing dampening of vibration, without forming a positive seal with the circular skirt member 50 if the coupling system is located in a noncontaminating environment. The resilient member therefore may take other suitable forms without departing from the spirit and scope of the present invention. It is considered practical, however to employ the combined benefits of sealing and vibration dampening, hence the preferred embodiment of this invention is shown to incorporate those features.

Since the bayonet connection between the arbor and coupling shaft is completely enclosed by the protective sleeve member 48, the bayonet slot is not visible to the user. Accordingly, it is desirable to provide an effective means for ensuring that the detent member 68 is positively received within the locking portion 38 of the bayonet slot. If not, obviously, the tool arbor could become unseated at high speed operation whereupon injury to the user could occur. For this reason, the enlarged diameter intermediate portion 72 of the arbor is formed to define indicia such as a circular indicia groove 92. The groove 92 is preferably filled with a white or other light colored substance enabling it to be readily visible to the user. The indicia groove 92 is positioned such that it is barely visible to the user when the detent member 68 is properly seated within the locking portion 38 of the bayonet slot. If, therefore, the arbor is inserted into the bayonet receptacle and the indicia groove is not visible, then the user is made immediately aware that the arbor is not properly locked and thus adjustment is necessary. The user then rotates the arbor member until the detent is driven into the locking portion 38 of the bayonet slot by the force of the compression spring 78. When this occurs, the indicia groove 92 becomes visible to the user thereby providing visual assurance that the arbor member is properly locked and unable to become inadvertently released from the bayonet connection.

In view of the foregoing, it is clear that the present invention provides effective sealing and vibration dampening of the bayonet connection between an arbor member and a rotatable or otherwise movable coupling shaft. Further, the mechanism provides an efficient means of insuring safe positioning of the arbor within the bayonet receptacle. A user may have several arbor devices, each provided with a particular working tool such that sequential operations may be accomplished simply by quick changing of the arbors relative to the coupling shaft. By simple manual operations, an arbor may be inserted into coupling relation with the shaft or removed therefrom without necessitating the use of special tools or other equipment. Working operations may therefore proceed efficiently for the accomplishment of work including various types of machining and surfacing operations. It is therefore seen that the present invention is one well adapted to attain all of the features and objects hereinabove set forth together with other features which will become apparent from an understanding of the apparatus itself. It is also intended that the character of bayonet coupling set forth herein may take other convenient forms without departing from the spirit and scope of the present invention. For example, rotary or linearly movable shafts may be releasably coupled with a bayonet connection embodying the present invention especially where contamination or mechanical vibration of the shaft are involved. The scope of the invention is therefore intended to be restricted only by the breadth of the claims set forth herein.

What is claimed is:

1. A quick-release locking coupling mechanism comprising:
   (a) a coupling shaft forming first and second ends and adapted at said second end for nonrotatable connection with a powered drive shaft;
   (b) a driven shaft;
   (c) one of said coupling shaft and driven shaft forming a bayonet receptacle;
   (d) the other of said coupling shaft and driven shaft forming a bayonet connector receivable by said bayonet receptacle;
   (e) protective skirt means extending axially beyond one of said coupling shaft and driven shaft and enclosing at least a portion of the other of said coupling shaft and driven shaft when the same are in coupled assembly, said protective skirt means forming an inner periphery; and
   (f) resilient means establishing a seal between said inner periphery of said protective shirt means and said other of said coupling shaft and driven shaft for sealing said bayonet receptacle and said bayonet connector against contamination, damping vibration therebetween and urging said coupling shaft and said driven shaft toward concentric relation.

2. A quick-release locking coupling as recited in claim 1, wherein said resilient means comprises an annular elastomeric member supported by one of said protective skirt means and said other of said coupling shaft and driven shaft.

3. A quick-release locking coupling as recited in claim 1, including indicia on the other of said coupling shaft and driven shaft which, in the coupled relation of said coupling shaft and driven shaft, is visible to the user when said bayonet connector is safely positioned in locked relation within said bayonet receptacle, thus providing the user with visual assurance of positive locking of the quick release locking coupling.

4. A quick-release locking coupling as recited in claim 1, wherein:
   (a) said bayonet receptacle is defined by at least one bayonet slot having an elongated slot portion extending generally parallel to the longitudinal axis of said one of said coupling shaft and driven shaft, a locking slot portion oriented substantially parallel to said longitudinal axis and to said elongated slot portion and a rotary slot portion interconnecting said elongated slot portion and said locking slot portion; and
   (b) detent means extends transversely from said other of said coupling shaft and driven shaft and is receivable within said bayonet slot.

5. A quick-release locking coupling as recited in claim 4, including means urging said coupling shaft and driven shaft in an axial direction securing said detent means within said locking slot portion of said bayonet slot.

6. A quick-release locking coupling as recited in claim 4, wherein:
   said bayonet slot means is spaced from said first end of said coupling shaft and said first end of said coupling shaft defines an unbroken circular wall providing resistance to hoop stresses applied thereto.

7. A quick-release locking coupling as recited in claim 1, wherein:
   (a) said bayonet receptacle is formed by an elongated bore for receiving said bayonet connector and a bayonet slot intersecting said elongated bore;
   (b) detent means extends from said bayonet connector and is receivable within said bayonet slot;
   (c) a follower receptacle is defined within said first end of said coupling shaft and is in communication with said bayonet receptacle; and
   (d) a spring urged follower is positioned about said bayonet connector and is normally urged against said detent means, said spring urged follower is received within said follower receptacle and displaced from said detent means when said bayonet connector is in locked assembly within said bayonet receptacle.

8. A quick-release locking coupling mechanism, comprising:
   (a) a coupling shaft forming first and second ends, said second end being adapted for nonrotatable connection with a rotatable drive shaft, said first end of said coupling shaft forming a tool arbor receptacle, said coupling shaft forming bayonet receptacle means and having a protective skirt extending axially beyond said first end of said coupling shaft and forming a dampening periphery;
   (b) a tool arbor adapted to support a tool and forming a connection portion receivable in close fitting relation within said tool arbor receptacle ;
   (c) locking detent means provided on said connection portion of said tool arbor and adapted to be received in locking relation within said bayonet receptacle means; and (d) resilient means carried by said tool arbor and establishing engagement with said dampening periphery with sufficient mechanical interference for dampening vibration between said protective skirt means and said tool arbor and urging said coupling shaft and said tool arbor toward concentric relation.

9. A quick-release locking coupling mechanism as recited in claim 8, wherein said resilient means comprises a circular elastomeric member supported by one of said protective skirt and said tool arbor, when said tool arbor is coupled in locked relation within said tool arbor receptacle and said bayonet receptacle means said elastomeric member is disposed in vibration dampening engagement with said dampening periphery of said protective skirt.

10. A quick-release locking coupling mechanism as recited in claim 9, wherein said circular elastomeric member establishes a seal with said dampening periphery of said protective skirt preventing dust and other contaminants from entering the coupling between said tool arbor and said tool arbor receptacle means.

11. A quick-release locking coupling mechanism as recited in claim 9, wherein said circular elastomeric member dampens relative lateral movement between said coupling shaft and tool arbor at a location axially offset from said bayonet receptacle means in the direction of said one end of said coupling shaft.

12. A quick-release locking coupling mechanism as recited in claim 9, wherein:
(a) said tool arbor defines an annular groove; and
(b) said circular elastomeric member is an O-ring positioned within said annular groove and extending radially from said annular groove for sealing contact with said dampening periphery of said protective skirt.

13. A quick-release locking coupling mechanism as recited in claim 8, wherein:
(a) said coupling shaft defines a longitudinal axis and an elongated bore forming said tool arbor receptacle and said bayonet receptacle means opening to said elongated bore;
(b) said tool arbor includes an elongated arbor shaft receivable within said elongated bore; and
(c) detent means extends radially from said elongated arbor shaft and is receivable within said bayonet receptacle means when said elongated shaft of said tool arbor is disposed within said elongated bore and is in coupled and locked relation within said bayonet receptacle means.

14. A quick-release locking coupling mechanism as recited in claim 13, wherein:
(a) said coupling shaft defines a follower receptacle within said first end thereof;
(b) a follower member is movably positioned about said elongated arbor shaft; and
(c) spring means is positioned about said elongated arbor shaft and normally urges said follower member into engagement with said detent means, upon locked assembly of said tool arbor and said bayonet receptacle means said follower member being positioned within said follower receptacle and displaced axially from said detent means against the spring force of said spring means.

15. A quick release locking coupling mechanism as recited in claim 13, wherein said bayonet receptacle means is defined by one or more bayonet slots, each bayonet slot comprising:
(a) an entry slot section extending linearly of and in parallel relation with the longitudinal axis of said coupling shaft;
(b) a locking slot section extending linearly of said coupling shaft and in parallel relation with said entry slot section;
(c) a rotary slot section interconnecting said entry slot section and locking slot section; and
(d) upon assembly of said tool arbor to said coupling shaft said detent traverses said entry slot section during movement of said elongated arbor shaft into said elongated bore, upon rotation of said tool arbor relative to said coupling shaft said detent means traverses said rotary slot section, upon outward movement of said tool arbor at the intersection of said rotary slot section and said locking slot section said detent means traverses and becomes seated in locked relation within said locking slot section.

16. A quick release locking coupling mechanism as recited in claim 15, wherein:
(a) said coupling shaft defines a follower receptacle within said first end thereof;
(b) a follower member is movably positioned about said elongated arbor shaft; and
(c) spring means is positioned about said elongated arbor shaft and normally urges said follower member into engagement with said detent means, upon locked assembly of said tool arbor and said bayonet receptacle said follower member being positioned within said follower receptacle and displaced axially from said detent means against the force of said spring means.

17. A quick release locking coupling mechanism as recited in claim 8, wherein:
(a) said bayonet receptacle means extends completely through said coupling shaft; and
(b) a sleeve member is disposed in interference fitted relation about a portion of said coupling shaft with a portion of said sleeve extending beyond said first end of said coupling shaft and forming said protective skirt, said sleeve member also forming an outer closure for said bayonet receptacle means.

18. A quick release locking coupling mechanism as recited in claim 17, wherein:
(a) a portion of said tool arbor defines an outer periphery of slightly smaller dimension than the internal dimension of said protective skirt and is positioned within said protective skirt when said tool arbor is assembled to said coupling shaft; and
(b) said resilient means being at least one elastomeric element interposed between and in interference relation with said portion of said tool arbor and said protective skirt.

19. A quick release locking coupling mechanism as recited in claim 18, wherein:
(a) said portion of said tool arbor defines an annular groove; and
(b) said resilient means comprises an annular elastomeric member received within said annular groove and having interference engagement with the inner periphery of said protective skirt and forming a seal between said protective skirt and said portion of said tool arbor preventing entry of foreign matter into said tool arbor receptacle and said bayonet receptacle means.

20. A quick release locking coupling as recited in claim 8, wherein:
said bayonet receptacle means is oriented relative to the direction of coupling shaft rotation such that relative rotational forces imparted between said coupling shaft and said detent oppose the relative direction of movement necessary for unlocking of said detent from said bayonet receptacle means.

* * * * *